2,991,905
GAS SEAL

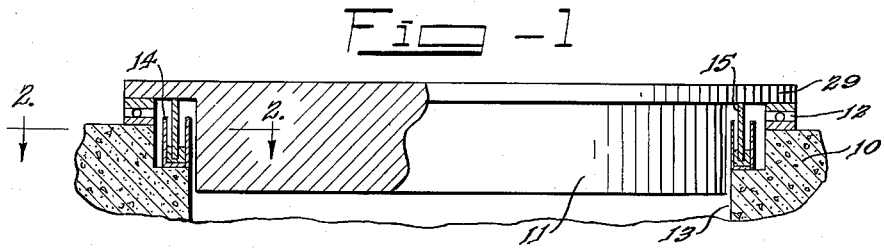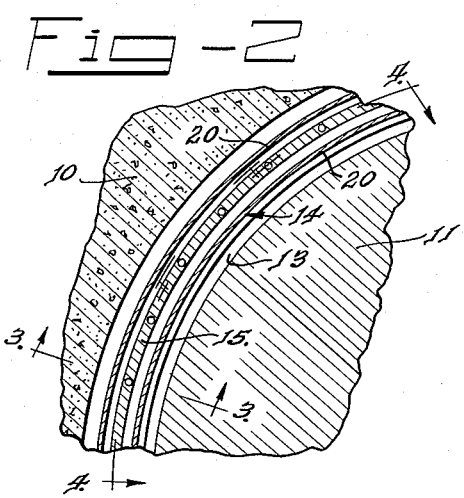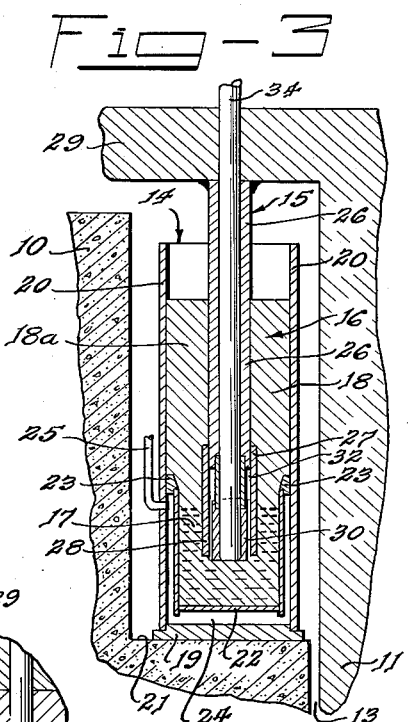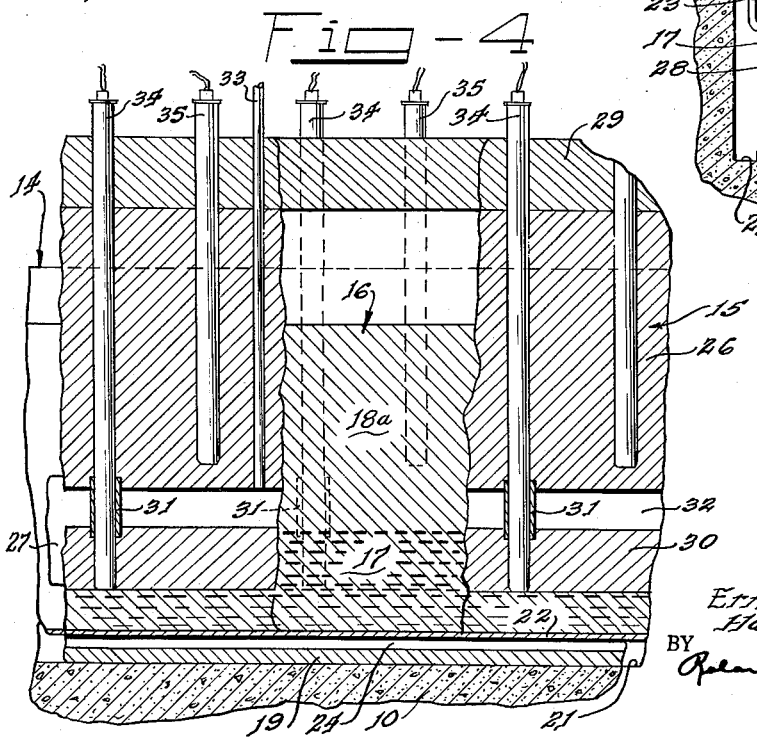

Harry Monson, Elmhurst, and Ernest Hutter, Chicago, Ill., assignors to the United States of America as represented by the United States Atomic Energy Commission
Filed Dec. 30, 1959, Ser. No. 863,060
8 Claims. (Cl. 220—45)

This invention relates to a gas seal. More specifically, it relates to an arrangement for sealing a vessel against the escape of gases that may be under widely varying pressures.

It is known to employ bodies of liquid for sealing against the escape of gases, but surging gas pressures in excess of the hydrostatic head of the liquid of the seal permit gas to escape. Freezing of the sealing liquid will prevent the gas from escaping on a pressure surge, but many freezing liquids shrink and leave at the enclosing walls shrinkage spaces through which gas will escape. Freezing of the liquids also tends to produce passages or pin holes through which gas can escape, and this is likely to occur even with sealing liquids that expand on freezing.

According to the present invention, a portion of a sealing mass is kept liquid while other portions are kept solid, so gas cannot escape through solidification openings in the sealing mass and cannot push the liquid portion out of the way so as to escape when the gas pressure exceeds the hydrostatic head of the liquid portion.

In the drawings:

FIG. 1 is a sectional view through a vessel and a cover to which the sealing arrangement of the present invention has been applied;

FIG. 2 is a sectional view taken on the line 2—2 of FIG. 1;

FIG. 3 is a sectional view taken on the line 3—3 of FIG. 2; and

FIG. 4 is a sectional view taken on the line 4—4 of FIG. 2.

In FIG. 1, the novel sealing arrangement of the present invention is shown as applied to a top 10 of a pressure vessel for a nuclear reactor and a plug-type cover 11, rotatably mounted by a bearing 12 on the top 10 so as to close an opening 13 in the top. The cover 11 may also carry a rotatable plug (not shown) to which the novel sealing arrangement is also applied. The center of rotation of the unshown plug is offset from the center of rotation of the cover 11 so that by appropriate angular adjustment or rotation of the cover 11 and the unshown plug access is had to objects such as nuclear-fuel elements in the reactor below the cover through one or two openings in the unshown plug. Such an arrangement of rotatable plug and rotatable cover is shown more fully in Zinn Patent 2,841,545, dated July 1, 1958.

The novel sealing arrangement of the present invention comprises a generally circular channel 14 connected to the vessel top 10, a generally circular member 15 connected to the cover 11, and a metal mass 16 contained in the channel 14 and receiving the member 15, a lower portion 17 of the mass 16 being kept molten and upper portions 18 and 18a of the mass 16 being kept solid. The upper portion 18 lies within the member 15, and the upper portion 18a lies outside the member 15.

The channel 14 comprises a base 19 and generally cylindrical sides 20 connected to the base 19. The base 19 rests on a shoulder 21 formed in the vessel top 10 around the opening 13. The channel 14 is provided with a U-member 22 which is connected interiorly of the channel 14 by welding rings 23 so as to form between the U-member 22 and the lower portion of the channel 14 an insulating space 24, from which air is exhausted through a line 25 so that the lower portion 17 of the metal mass 16 is kept hot and thus molten. The metal mass 16 is preferably formed of an alloy composed of 58 w/o Bi and 42 w/o Sn, which melts at 281° F. and expands slightly on freezing, although this is not required of the metal mass 16. The channel 14 and U-member 22 may be formed of stainless steel. The portion of the cover 11 shown in the drawing may be formed of concrete for shielding purposes. The member 15 may be formed of a short tubular section 26 of stainless steel and radially spaced internal and external skirts 27 and 28 of stainless steel welded to the lower end of the tubular section 26. The upper end of the tubular section 26 is suitably attached to a flange 29 on the cover 11, which flange overlaps the vessel top 10 and is directly associated with the bearing 12.

The lower molten portion 17 of the metal mass 16 extends from the base 19 of the channel 14 upwardly over the end or edge of the member 15 facing the channel base 19, which end or edge is formed by the skirts 27 and 28. The lower molten portion 17 also extends from one side of the channel 14 to the other or, more particularly, from one side of the U-member 22 to the other. The upper solid portions 18 and 18a of the metal mass 16 extend upwardly from the lower molten portion 17 inside and outside the member 15 to a region near the top of the channel 14 and also from the member to the sides 20 of the channel 14.

As shown in FIGS. 3 and 4, a copper heating ring 30 is carried by the lower end of the tubular section 26 by means of short stainless-steel ferrules 31 bonded to the ring and the tubular section, so that there is a space 32 between the ring and the tubular section and the ring lies within the skirts 27 and 28 so as to be slightly spaced therefrom. The space 32 is filled with air or other gas at atmospheric pressure or slightly above supplied through a line 33 extending through the tubular member 26, so that the molten portion 17 of the metal mass 16, when expanding with increasing temperature, can enter the space 32 and will not dislodge the solid portions 18 and 18a of the metal mass or distort the channel 14. The ferrules 31 are distributed in peripherally spaced relation about the tubular section 26 and the heating ring 30 so that the latter is uniformly supported.

The ring 30 is heated by a plurality of electrical heating units 34 which extend downwardly through the cover flange 29, tubular section 26, and ferrules 31 into the ring 30. The heating units 34 are not shown in detail, since they form, per se, no part of the present invention, but it will be understood that they may be of the resistance type and may comprise a stainless-steel casing closed at its lower end, a helical nickel-chromium resistor wire in the lower portion of the casing vertically coextensive with the heating ring 30, a packing of granular magnesium oxide in which the helical wire is embedded, and suitable low-resistance leads extending from the helical wire up through insulation in the casing and out the top thereof.

Additional electrical heating units 35 are provided in the tubular section 26 between the units 34 as shown in FIG. 4, and may be of the same type as the units 34. The purpose of the units 35, however, is to liquefy the upper solid portion 18 of the metal mass 16 when the cover 11 is to be rotated. Thus the heating units 35 extend only as far down as a region just above the bottom of the tubular section 26. It will be understood that the resistance wires in the units 35 will be nearly vertically coextensive with the normally solid upper portion 18 of the metal mass 16.

During normal operation of the sealing arrangement of the present invention, the heating units 34 are turned on and the heating units 35 are turned off so that the lower portion 17 of the metal mass 16 is liquid and the upper portions 18 and 18a are solid. The solid portions 18 and 18a prevent the liquid portion 17 from being bodily displaced by gas surges in excess of the hydrostatic head of the liquid portion 17. If the inner solid portion 18 has holes, gas under high pressure from the interior of the vessel will merely drive some liquid from the portion 17 into any holes in the outer solid portion 18a, with the result that sealing will take place and no gas leakage will occur.

The intention is to limit the invention only within the scope of the appended claims.

What is claimed is:

1. A seal comprising a channel, a member positioned in the channel so as to be spaced from the sides and base thereof and to extend beyond the top thereof, and a metal mass located in the channel extending across the interior of the channel from one side thereof to the other side and comprising a molten portion extending from one side of the channel to the other and from the base thereof over the end of the member facing the base and two solid portions extending from the molten portion in a direction away from the base of the channel and from the faces of the member to the sides of the channel.

2. A seal comprising a U-shaped channel formed in a closed path or loop, a member also formed in a closed path or loop and extending about the channel between its sides in spaced relation to its sides and its base, and a metal mass extending about the channel between its sides and over both faces of the member and the end thereof facing the base, the metal mass comprising a molten portion extending from the base of the channel to and over the said end of the member facing the base of the channel, and two solid portions extending from the molten portion on opposite sides of the member.

3. A seal comprising a generally circular channel having cylindrical sides, a generally cylindrical member extending about the channel between its sides in spaced relation to its sides and its base, and a metal mass extending throughout the channel so as to immerse the edge of the member facing the base of the channel, the metal mass comprising a molten portion extending from the base of the channel over the said edge of the member, and two solid portions extending from the molten portions at opposite faces of the member.

4. An assembly comprising a vessel having an opening, a channel connected with the vessel so as to extend about the opening, a cover for the opening, a member connected with the cover so as to extend thereabout, the member being positioned in the channel in spaced relation to its sides and its base, and a metal mass at least partially filling the channel so as to immerse the edge of the member facing the base of the channel and the inner and outer faces of the member for a considerable distance from the said edge of the member, the metal mass comprising a molten portion extending from the base of the channel over the said edge of the member and two solid portions extending from the molten portions on both sides of the member.

5. An assembly comprising a vessel having a generally circular opening in its top, a generally circular upwardly opening U-shaped channel connected with the vessel so as to extend about the opening therein, a generally circular cover for the opening, a generally circular member attached to the peripheral regions of the cover and extending about and in the channel in spaced relation to its sides and base, and a metal mass at least partially filling the channel and extending thereabout so as to cover the edge of the member facing the base of the channel and the interior and exterior of the member for an appreciable distance from its said edge, the metal mass comprising a molten portion extending from the base of the channel up over the said edge of the member facing the base of the channel, and two solid portions extending from the molten portion inside and outside the member.

6. The assembly specified in claim 5 and further comprising heating means at the edge of the generally circular member facing the base of the channel for maintaining the molten portion of the metal mass in molten condition.

7. The assembly specified in claim 5, the generally circular member comprising a short tubular section and annular skirts secured to the tubular section so as to extend beyond the lower edge thereof, the assembly further comprising a heating ring suspended from and in spaced relation to the tubular section and located in the annular space formed between the tubular section and the skirts, the heating ring serving to maintain the molten portion of the metal mass in molten condition.

8. The assembly specified in claim 7 and further comprising electric heating units circumferentially distributed about the tubular section and extending through longitudinal openings therein into the heating ring.

References Cited in the file of this patent

UNITED STATES PATENTS

| 1,591,432 | Noble | July 6, 1926 |
| 2,401,170 | Lepka | May 28, 1946 |

FOREIGN PATENTS

| 646,958 | France | July 23, 1928 |